(12) United States Patent
Wang et al.

(10) Patent No.: US 7,066,654 B2
(45) Date of Patent: Jun. 27, 2006

(54) COUNTER-ROTATING ANTIFRICTION BEARING ASSEMBLY

(75) Inventors: Xu Wang, Beijing (CN); Guopu An, Tianjin (CN); Herman Heping Cheng, Beijing (CN)

(73) Assignee: GED International Inc., Chicago, IL (US)

( * ) Notice: Subject to any disclaimer, the term of this patent is extended or adjusted under 35 U.S.C. 154(b) by 281 days.

(21) Appl. No.: 10/471,495

(22) PCT Filed: Jul. 8, 2003

(86) PCT No.: PCT/CN03/00542

§ 371 (c)(1),
(2), (4) Date: Sep. 11, 2003

(87) PCT Pub. No.: WO2005/003578

PCT Pub. Date: Jan. 13, 2005

(65) Prior Publication Data

US 2005/0244090 A1    Nov. 3, 2005

(30) Foreign Application Priority Data

Jul. 8, 1906  (WO) ...................... PCT/cn09/00542

(51) Int. Cl.
*F16C 19/20*    (2006.01)
(52) U.S. Cl. ........................ 384/553; 384/572
(58) Field of Classification Search ........ 384/521–523, 384/552–555, 572
See application file for complete search history.

(56) References Cited

U.S. PATENT DOCUMENTS

| | | | | |
|---|---|---|---|---|
| 661,863 A * | 11/1900 | Godfrey | .................... | 384/553 |
| 874,401 A * | 12/1907 | Greiner | ...................... | 384/521 |
| 931,931 A * | 8/1909 | Killian | ........................ | 384/553 |
| 1,003,551 A * | 9/1911 | Upton | ........................ | 384/553 |
| 1,757,199 A * | 5/1930 | Killian | ....................... | 384/555 |
| 2,011,184 A * | 8/1935 | Peters | ........................ | 384/553 |

(Continued)

FOREIGN PATENT DOCUMENTS

CA        2 333 497        11/2000

(Continued)

*Primary Examiner*—Thomas R. Hannon
(74) *Attorney, Agent, or Firm*—Whyte Hirschboeck Dudek SC

(57) ABSTRACT

Disclosed herein is a bearing assembly comprising: an outer race having an inner surface; an inner race having an outer surface, the inner surface of the outer race and the outer surface of the inner race defining a bearing assembly raceway; a plurality of main rollers positioned within the bearing assembly raceway, the main rollers in contact with the inner surface of the outer race and the outer surface of the inner race; a plurality of mediate rollers positioned within the bearing assembly raceway counter-rotating with the main rollers such that each of the mediate rollers is in rolling contact with a pair of the plurality of main rollers; and a cage positioned in the bearing assembly raceway for at least partially bounding each of the mediate and main rollers. In one embodiment, the cage can be positioned within the bearing assembly raceway and comprises a cage body, the body having a plurality of parallel annular rims joined by a plurality of rungs, the rungs separated so as to define a plurality of main roller openings in the cage body for receiving the plurality of main rollers, the rungs having a plurality of mediate roller retainers extending from the rungs, the retainers permitting counter-rotating of the mediate rollers with the main rollers in the main roller openings. The inventive bearing assembly results in substantial reduction of noise and vibration when compared to conventional bearing assemblies.

27 Claims, 3 Drawing Sheets

U.S. PATENT DOCUMENTS

| | | | | |
|---|---|---|---|---|
| 2,607,639 | A | * | 8/1952 | Panhard .................. 384/553 |
| 3,411,839 | A | * | 11/1968 | Johnston ................. 384/553 |
| 4,174,141 | A | | 11/1979 | Reiss ..................... 308/206 |
| 2004/0091189 | A1 | * | 5/2004 | Yu et al. ................. 384/522 |

FOREIGN PATENT DOCUMENTS

| | | |
|---|---|---|
| DE | 41 33 296 A1 | 1/1993 |
| EP | 0 356 882 A1 | 3/1990 |

* cited by examiner

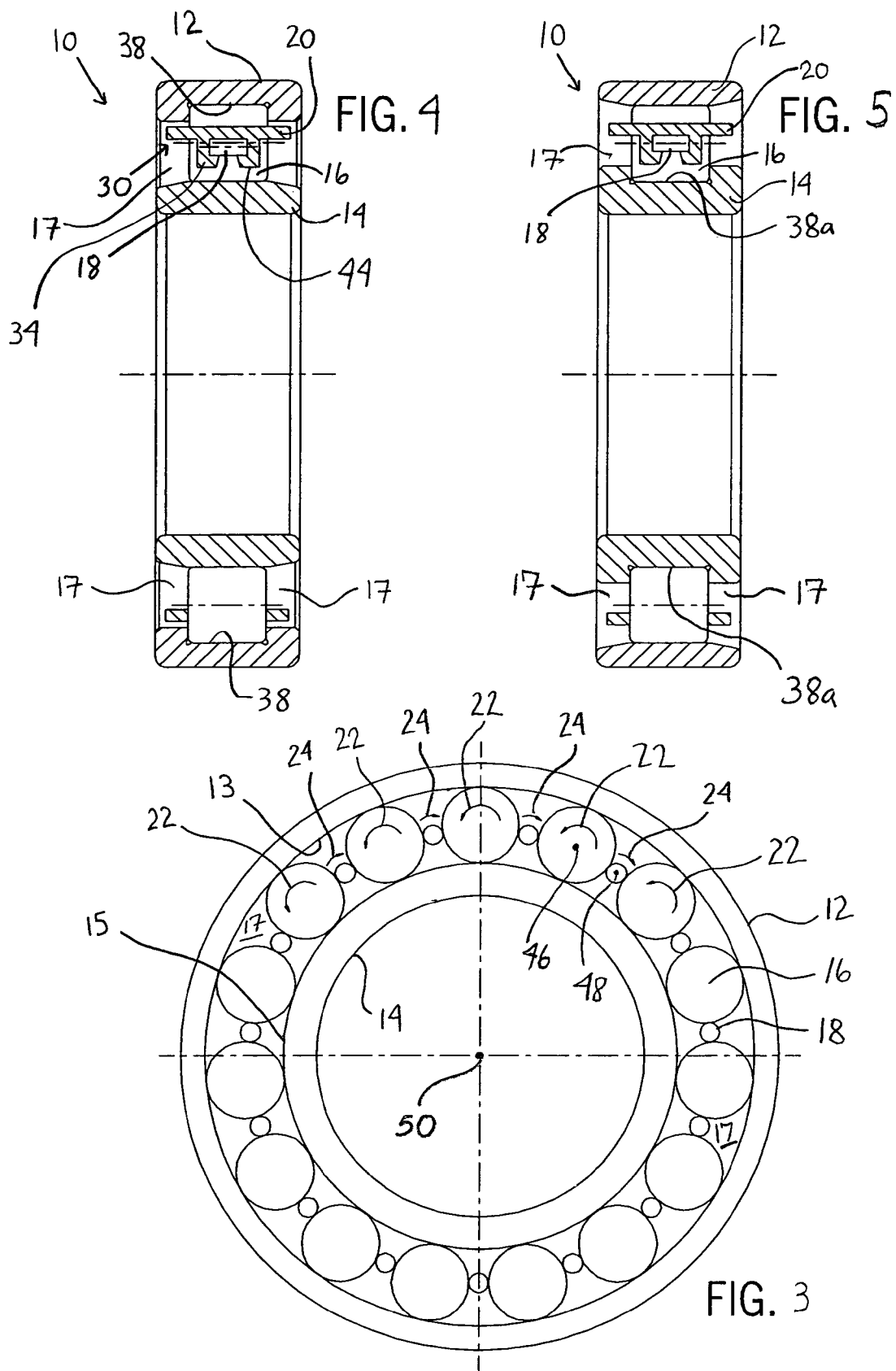

COUNTER-ROTATING ANTIFRICTION BEARING ASSEMBLY

BACKGROUND OF THE INVENTION

The invention relates to bearings generally, and antifriction bearings more specifically.

Antifriction bearings come in a variety of types, but typically fall into two categories, namely, ball bearings and roller bearings. Both types of bearings operate according to a similar principle, namely, rolling motion of rolling elements, such as balls or rollers, between rotating and stationary members. The rolling motion is utilized to reduce friction, and thus, the term "antifriction" is used.

Bearings are classified according to their ability to sustain radial and thrust loads, as well as combined radial and thrust loads. In addition, the shape of the rollers or balls determine bearing classification. Rolling element shapes include: spherical, cylindrical, tapered, and needled.

In the design of roller bearings, a continuous goal is to extend the useable life and enhance the overall performance of the roller bearing. Typically, a cage structure is used to separate and contain the rollers within a bearing. The result is increased friction and vibration generated between the rollers and the cage because of the contact between the rotating rollers and the relatively static cage. Such increased friction and vibration result in increased temperature and noise.

Therefore, it would be desirable in the commercial bearing industry for the roller bearing to decrease the friction and vibration caused the elements in the bearing assembly, thereby decreasing temperature and noise, as well as wear of the bearing, and increasing the life and performance of the bearing. It would also be desirable to decrease the extent of direct contact between rolling elements and the cage structure.

It would be particularly desirable to enable a bearing to accommodate rolling elements that are adjacent to and, when in a dynamic state, in rolling contact with each other. In this instance, the elements that are adjacent and in rolling contact can be termed "counter-rotating." There is specific need in the industry for bearings having counter-rotating rolling elements so as to achieve the goals noted above.

BRIEF SUMMARY OF THE INVENTION

Disclosed herein is a bearing assembly comprising: an outer race having an inner surface; an inner race having an outer surface, the inner surface of the outer race and the outer surface of the inner race defining a bearing assembly raceway; a plurality of main rollers positioned within the bearing assembly raceway, the main rollers in contact with the inner surface of the outer race and the outer surface of the inner race; a plurality of mediate rollers positioned within the bearing assembly raceway counter-rotating with the main rollers such that each of the mediate rollers is in rolling contact with a pair of the plurality of main rollers; and a cage positioned in the bearing assembly race way for at least partially bounding each of the mediate and main rollers.

In one embodiment, the cage can be positioned within the bearing assembly raceway and comprises a cage body, the body having a plurality of parallel annular rims joined by a plurality of rungs, the rungs separated so as to define a plurality of main roller -openings in the cage body for receiving the plurality of main rollers, the rungs having a plurality of mediate roller retainers extending from the rungs, the retainers permitting counter-rotating of the mediate rollers with the main rollers in the main roller openings.

Also disclosed is a cage for use in an antifriction bearing assembly. The assembly includes an outer race having an inner surface, an inner race having an outer surface, the inner surface of the outer race and the outer surface of the inner race defining a bearing assembly raceway, a plurality of main rollers positioned within the bearing assembly raceway, the main rollers in contact with the inner surface of the outer race and the outer surface of the inner race, a plurality of mediate rollers positioned within the bearing assembly raceway in alternating relationship with the main rollers such that each of the mediate rollers is in rolling contact with a pair of the plurality of main rollers. The cage is positioned within the bearing assembly raceway and comprises: a cage body, the body having a plurality of parallel annular rims joined by a plurality of rungs, the rungs separated so as to define a plurality of main roller openings in the cage body for receiving the plurality of main rollers, the rungs having a plurality of mediate roller retainers extending from the rungs, the retainers permitting counter-rotating of the mediate rollers with the main rollers in the main roller openings.

Other aspects, embodiments, objects and advantages of the present invention will be apparent from a detailed reading of the drawings and detailed description that follows, including the claims.

BRIEF DESCRIPTION OF THE DRAWINGS

The drawings illustrate the best mode presently contemplated for carrying out the invention.

FIG. 3 is a schematic view of the bearing assembly of the present invention illustrating the counter-rotating rolling elements;

FIG. 4 is a cross-sectional view taken along line 4—4 of FIG. 1; and

FIG. 5 is a cross-sectional view similar to that of FIG. 4 illustrating another embodiment of the present invention.

DETAILED DESCRIPTION OF THE INVENTION

Figure 1:
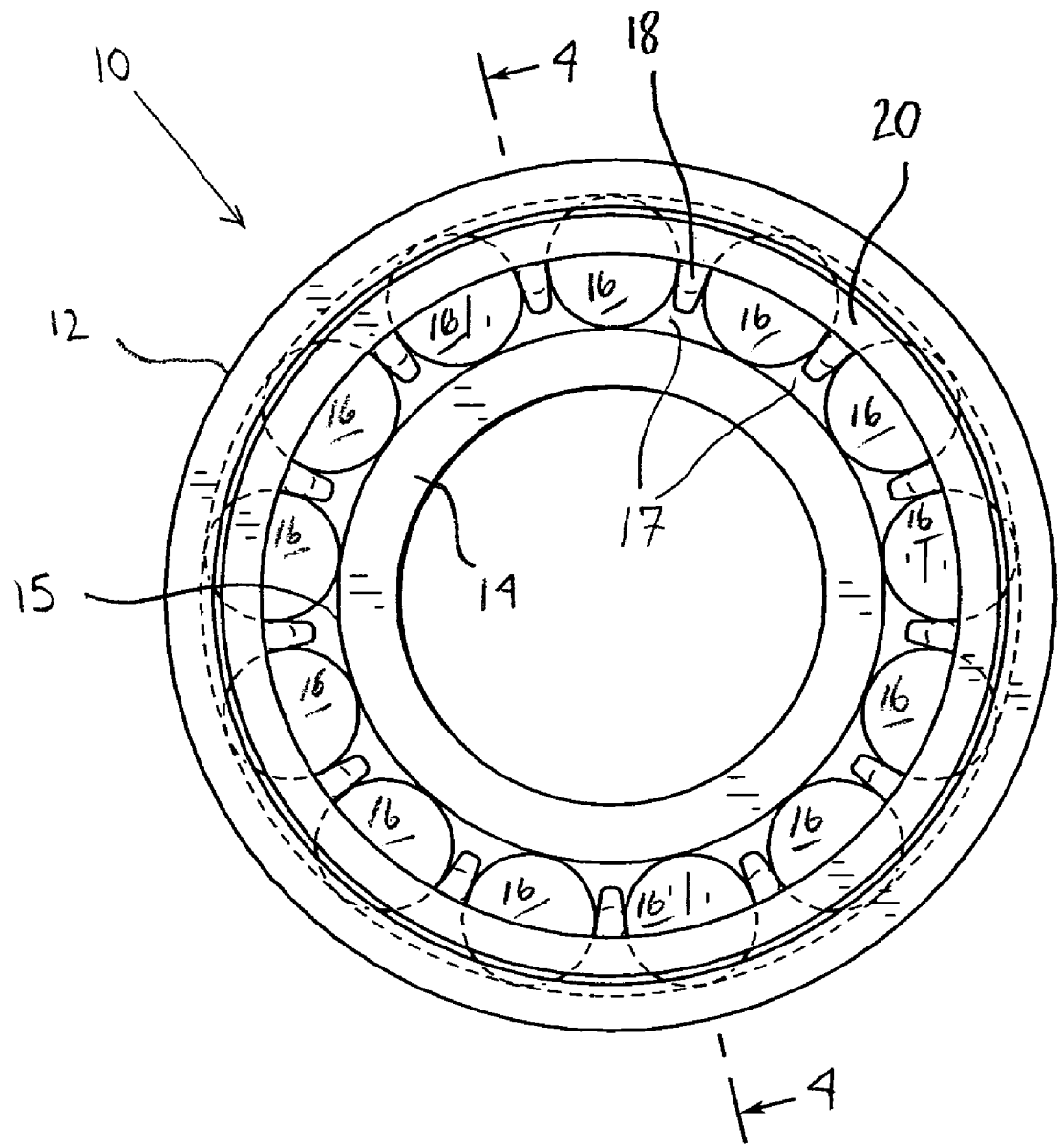
FIG. 1 is a front view of a bearing assembly according to one aspect of the present invention.
Figure 2:
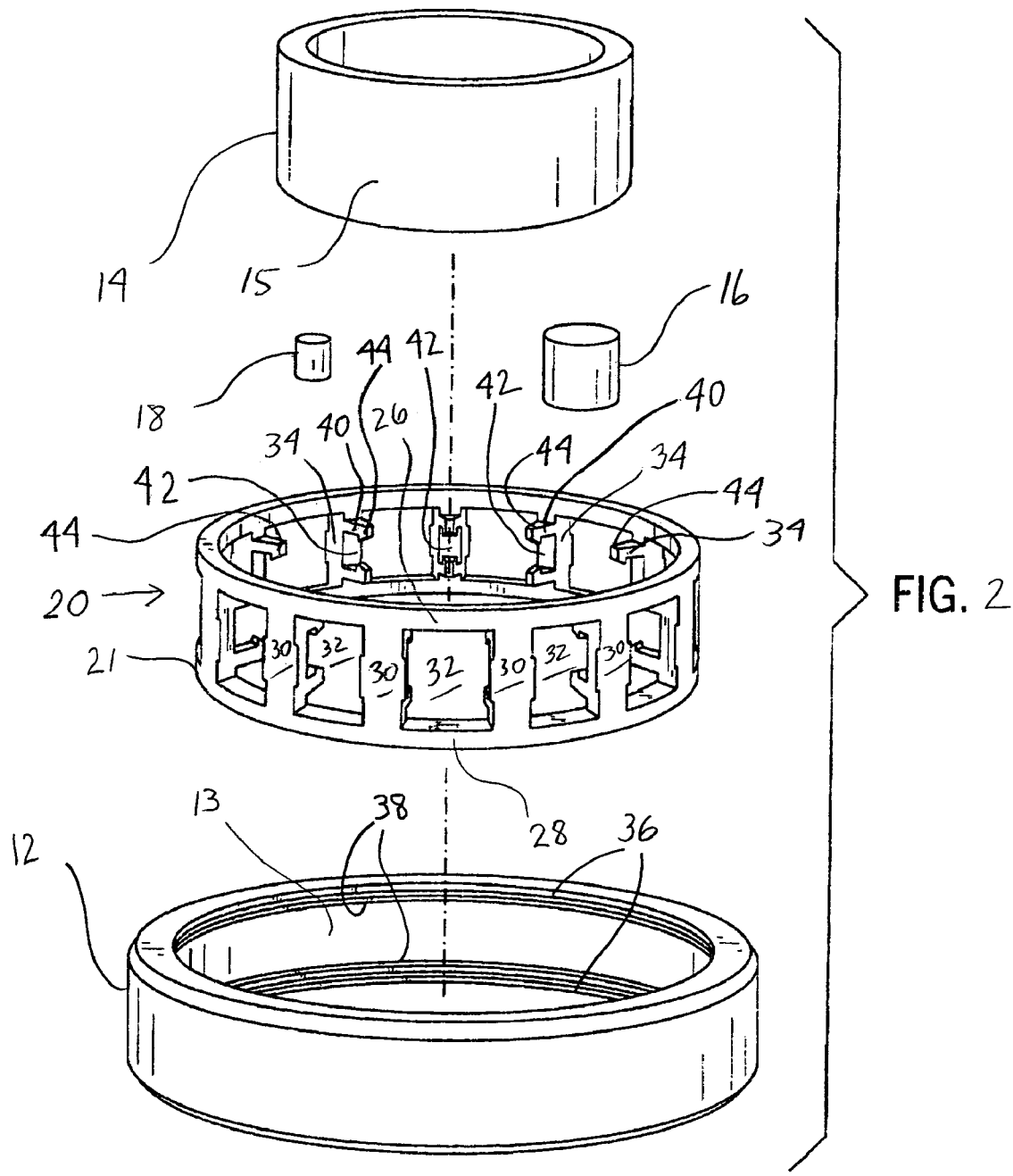
FIG. 2 is an exploded perspective view of the bearing assembly of FIG. 1 in which only two bearing rollers are illustrated.

FIG. 1 is a front view of a bearing assembly 10 according to one aspect of the present invention and FIG. 2 is an exploded perspective view of the bearing assembly of FIG. 1. The bearing assembly 10 includes an outer race 12 having an inner surface 13. The assembly 10 further includes an inner race 14 having an outer surface 15. The inner surface 13 of the outer race 12 and the outer surface 15 of the inner race 14 define a bearing assembly raceway 17. A plurality of main rollers 16, more generally rolling elements, is positioned within the bearing assembly raceway 17, and the main rollers are in contact with the inner surface 13 of the outer race 12 and the outer surface 15 of the inner race 14. A plurality of mediate rollers 18 is positioned within the bearing assembly raceway 17 counter-rotating with the plurality of main rollers 16 such that each of the mediate rollers is in rolling contact with a pair of the plurality of main rollers. A cage 20 is positioned in the bearing assembly raceway 17 for at least partially bounding each of the plurality of mediate and main rollers 18 and 16, respectively.

FIG. 3 is a schematic view of the bearing assembly of the present invention illustrating that the plurality of main and mediate rollers 16 and 18, respectively, function as "counter-rotating" rolling elements. Specifically, as the main rollers 16 rotate in a direction indicated by arrows 22, mediate rollers 18 rotate in a direction indicated by arrows 24, which is an opposing direction, or direction counter to, the direction indicated by arrows 22. It is noted that the main and mediate rollers are in rolling contact. The mediate rollers are one of held in position by and in rolling contact with the main rollers. The counter-rotating rollers include main and mediate roller axes of rotation 46 and 48, respectively, and the counter-rotating rollers 16 and 18, respectively, are positioned relative each other such that the axes of rotation are substantially equidistant from a bearing assembly centerline 50.

In operation, inner race 14 is rotatably driven, as by a shaft (not shown) or other movement means. The shaft can be driven in a conventional manner, for example, using an electric motor (not shown). Rotation of the inner race imparts rotation to the plurality of main rollers 16 which roll along the outer surface of the inner race and are in contact with the inner surface of the outer race 12 in the bearing assembly raceway 17. In one application, the outer race can remain stationary. The main rollers are in rolling contact with the adjacent mediate rollers 18. The main and mediate rollers rotate about their respective axes in opposite directions, and thus, are counter-rotating. The cage (FIG. 2) bounds the main and mediate rollers and permits the couter-rotating of both types of rollers. In an alternate arrangement, the outer race can be driven and the inner race can remain stationary. This would result in the plurality of main and mediate rollers rotating in opposite directions about their axes, while still counter-rotating with respect to each other. The result is a relatively static, or unmoving, cage with rotating, but not revolving, roller elements.

FIG. 4 is a cross-sectional view taken along line 4—4 of FIG. 1. Referring to FIGS. 2 and 4, the bearing assembly 10 includes cage 20 which is positioned within the bearing assembly raceway 17. Cage 20 comprises a cage body 21, the body having a plurality of parallel annular rims or rim sections 26 and 28, respectively, which are joined by a plurality of rungs or rung sections 30. The rung 30 are separated so as to define a plurality of main roller openings 32, or main rolling element openings, in the cage body for receiving the plurality of main rollers 16. The rung 30 include a plurality of mediate roller retainers 34, or mediate rolling element retainers, that extend from the rung for retaining the plurality of mediate rollers 18, while permitting rotation of the mediate rollers 18. The function of the retainers is to restrain, position, or otherwise guide the rolling elements. The mediate rollers 18 are in rolling contact with the main rollers 16. The bearing assembly outer race 12 includes a cage groove 36 (see FIG. 2) formed in the inner surface 13 of the outer race for receiving the cage.

Still referring to FIGS. 2 and 4, the bearing assembly outer race 12 includes a main bearing roller groove 38, or track, that is formed or created in the inner surface 13 of the outer race for guiding the plurality of main rollers 16. In one embodiment, the plurality of main rollers are cylindrically-shaped and the groove 38 includes a rectangular cross-section (see FIG. 4) for guiding movement of the plurality of cylindrically-shaped main rollers on the inner surface 13.

Turning to FIG. 5, a cross-sectional view similar to that of FIG. 4 is shown illustrating another embodiment of the present invention. In this embodiment, inner race 14 includes a main-bearing roller groove 38a, or track, formed or otherwise created in the inner surface 13 of the inner race for guiding rotation of the plurality of main rollers 16 within the raceway 17. In one embodiment, the plurality of main rollers 16 are cylindrically-shaped and the inner race main bearing roller groove 38a includes a rectangular cross-section for guiding movement of a plurality of cylindrically-shaped main rollers within the raceway 17.

Referring again to FIGS. 2 and 4, the cage 20 includes a plurality of mediate roller retainers 34 that extend from the rungs 30. The retainers 34 permit counter-rotating of the mediate rollers 18. Each of the retainers 34 includes a plurality of extensions 40 that create a mediate roller retaining space 42 in each of the retainers. Each of the extensions 40 includes a plurality of tapered protruding portions 44. In general, the retainers function to ensure that, during use of the bearing assembly, the main rollers remain in rolling contact with the mediate rollers. In a preferred embodiment, the cage body is removeably engaged with the outer race. In another preferred embodiment, the cage body is not engaged directly with the inner race.

It is of note that the mediate rollers are not in rolling contact with both the inner surface of the outer race and the outer surface of the inner race. Stated another way, each of the plurality of mediate rollers is in rolling contact with only a pair of the plurality of main rollers. As shown herein, each of the plurality of main rollers are larger than the plurality of mediate rollers, making such an arrangement possible.

The inventive bearing assembly can be manufactured using conventional techniques known in the bearing art. A variety of materials are suitable for use in the present invention. In one embodiment, at least one of the plurality of main rollers, the plurality of mediate rollers, the inner race and the outer race is constructed of a steel material, such as ANSI/ASTM A295 standard 52100 steel. In one embodiment, the cage can be constructed of a glass fiber enhanced nylon. In another embodiment, the cage can be constructed of Polyamide 66. The materials and overall design of the present bearing assembly result in reduced overall friction, and thus temperature, of the bearing assembly components during operation.

Commericial applications for the present inventive bearing assembly include, but are not limited to, electrical motors, transmissions, automotive equipment, agricultural equipment, and other machinery. Design parameters for construction include: the diameters of the inner and outer races, and the size of the rolling elements, as determined, for example, by a roller length or roller diameter. It is contemplated that the bearing assembly described herein, constructed from its various components, can be of the ground or unground types.

Each of the plurality of main and mediate rollers has a diameter and, in a preferred embodiment, the main roller-diameter is larger than the mediate roller diameter. In one preferred embodiment, the ratio of the main roller diameter to the mediate roller diameter is between from about 3 to 1 to about 5 to 1. Moreover, each of the plurality of main and mediate rollers has a length and, preferably, the main roller length is longer than the mediate roller length. In a preferred embodiment, the ratio of the main roller length to the mediate roller length is between from about 2 to 1 to about 3 to 1.

The present invention has been described in terms of preferred embodiments. Equivalents, alternatives, and modifications, aside from those expressly stated herein, are possible and should be understood to be within the scope of the appending claims.

What is claimed is:

1. A bearing assembly comprising:
   an outer race having an inner surface;
   an inner race having an outer surface, the inner surface of the outer race and the outer surface of the inner race defining a bearing assembly raceway;
   a plurality of main rollers positioned within the bearing assembly raceway, the main rollers in contact with the inner surface of the outer race and the outer surface of the inner race;
   a plurality of mediate rollers positioned within the bearing assembly raceway counter-rotating with the main rollers such that each of the mediate rollers is in rolling contact with a pair of the plurality of main rollers; and
   a cage positioned in the bearing assembly raceway for at least partially bounding each of the mediate and main rollers;
   wherein the cage positioned within the bearing assembly raceway comprises a cage body, the body having a plurality of parallel annular rims joined by a plurality of rungs, the rungs separated so as to define a plurality of main roller openings in the cage body for receiving the plurality of main rollers, the rungs having a plurality of mediate roller retainers extending from the rungs, the retainers permitting counter-rotating of the mediate rollers with the main rollers in the main roller openings.

2. The bearing assembly of claim 1 wherein the outer race includes a cage groove formed in the inner surface of the outer race for containing the cage.

3. The bearing assembly of claim 1 wherein the outer race includes a main bearing roller groove formed in the inner surface of the outer race for guiding rotation of the plurality of main rollers when rolling along the inner surface.

4. The bearing assembly of claim 3 wherein the plurality of main rollers are cylindrically-shaped and the groove includes a generally rectangular cross-section for guiding movement of the plurality of cylindrically-shaped main rollers capable of rolling along the inner surface.

5. The bearing assembly of claim 1 wherein the inner race includes main bearing roller groove formed in the outer surface of the inner race for guiding rotation of the plurality of main rollers within the raceway.

6. The bearing assembly of claim 5 wherein the plurality of main rollers are cylindrically-shaped and wherein the inner race main bearing roller groove includes a generally rectangular cross-section for guiding movement of the plurality of cylindrically-shaped main rollers within the raceway.

7. The bearing assembly of claim 1 wherein the plurality of mediate roller retainers extending from the rungs include a plurality of extensions that create a mediate roller retaining space.

8. The bearing assembly of claim 1 wherein the extensions include a plurality of tapered protruding portions.

9. The bearing assembly of claim 1 wherein the plurality of main roller openings in the cage body are substantially rectangular so as to accommodate the plurality of main rollers, and wherein the main rollers are substantially cylindrical in shape.

10. The bearing assembly of claim 1 wherein the mediate rollers are one of held in position by and in rolling contact with the main rollers.

11. The bearing assembly of claim 1 wherein the counter-rotating rollers include axes of rotation, and the counter-rotating rollers are positioned relative each other such that the axes of rotation are substantially equidistant from the bearing assembly centerline.

12. The bearing assembly of claim 1 wherein the mediate rollers are not in rolling contact with both the inner surface of the outer race and the outer surface of the inner race.

13. The bearing assembly of claim 1 wherein each of the plurality of mediate rollers is in rolling contact with only a pair of the plurality of main rollers.

14. The bearing assembly of claim 1 wherein plurality of main rollers are larger than the plurality of mediate rollers.

15. The bearing assembly of claim 1 wherein at least one of the plurality of main rollers, the plurality of mediate rollers, the inner race and the outer race is constructed of a steel material that conforms to ANSI/ASTM A295 52100 standard.

16. The bearing assembly of claim 1 wherein cage is constructed of a glass fiber enhanced nylon.

17. The bearing assembly of claim 1 wherein cage is constructed of Polyamide 66.

18. A bearing assembly comprising:
    an outer race having an inner surface;
    an inner race having an outer surface, the inner surface of the outer race and the outer surface of the inner race defining a bearing assembly raceway;
    a plurality of main rolling elements positioned within the bearing assembly raceway, the rolling elements in contact with the inner surface of the outer race and the outer surface of the inner race;
    a plurality of mediate rolling elements positioned within the bearing assembly raceway counter-rotating with the main rolling elements such that each of the mediate rolling elements is in rolling contact with a pair of the plurality of main rolling elements; and a cage positioned within the bearing assembly raceway, the cage comprising a cage body, the body having a plurality of parallel annular rims joined by a plurality of rungs, the rungs separated so as to define a plurality of main rolling element openings in the cage body for receiving the plurality of main rolling elements, the rungs having a plurality of mediate rolling element retainers extending from the rungs, the retainers permitting counter-rotating of the mediate rolling elements with the main rolling elements in the main rolling element openings;
    wherein the extensions include a plurality of tapered protruding portions.

19. The bearing assembly of claim 18 wherein the plurality of main and mediate rolling elements are in rolling contact with each other such that the plurality of main rolling elements roll in an opposite direction with respect to the plurality of mediate rolling elements.

20. The bearing assembly of claim 18 wherein the plurality of main and mediate rolling elements are rollers.

21. The bearing assembly of claim 18 wherein the plurality of mediate rolling element retainers extending from the rungs include a plurality of extensions that create a mediate rolling element retaining space.

22. A bearing assembly comprising:
    an outer race having an inner surface;
    an inner race having an outer surface, the inner surface of the outer race and the outer surface of the inner race defining a bearing assembly raceway;
    a plurality of main rolling elements positioned within the bearing assembly raceway, the rolling elements in contact with the inner surface of the outer race and the outer surface of the inner race;
    a plurality of mediate rolling elements positioned within the bearing assembly raceway counter-rotating with the main rolling elements such that each of the mediate rolling elements is in rolling contact with a pair of the plurality of main rolling elements; and a cage positioned within the bearing assembly raceway, the cage comprising a cage body, the body having a plurality of parallel annular rims joined by a plurality of rungs, the rungs separated so as to define a plurality of main rolling element openings in the cage body for receiving the plurality of main rolling elements, the rungs having a plurality of mediate rolling element retainers extending from the rungs, the retainers permitting counter-rotating of the mediate rolling elements with the main rolling elements in the main rolling element openings;

wherein each of the plurality of main and mediate rollers has a diameter and the main roller diameter is larger than the mediate roller diameter;

wherein the plurality of main and mediate rolling elements are rollers.

23. The bearing assembly of claim 22 wherein the ratio of the main roller diameter to the mediate roller diameter is between from about 3 to 1 to about 5 to 1.

24. A bearing assembly comprising:
an outer race having an inner surface;
an inner race having an outer surface, the inner surface of the outer race and the outer surface of the inner race defining a bearing assembly raceway;
a plurality of main rolling elements positioned within the bearing assembly raceway, the rolling elements in contact with the inner surface of the outer race and the outer surface of the inner race;
a plurality of mediate rolling elements positioned within the bearing assembly raceway counter-rotating with the main rolling elements such that each of the mediate rolling elements is in rolling contact with a pair of the plurality of main rolling elements; and a cage positioned within the bearing assembly raceway, the cage comprising a cage body, the body having a plurality of parallel annular rims joined by a plurality of rungs, the rungs separated so as to define a plurality of main rolling element openings in the cage body for receiving the plurality of main rolling elements, the rungs having a plurality of mediate rolling element retainers extending from the rungs, the retainers permitting counter-rotating of the mediate rolling elements with the main rolling elements in the main rolling element openings;

wherein each of the plurality of main and mediate rollers has a diameter and the main roller diameter is larger than the mediate roller diameter;

wherein the plurality of main and mediate rolling elements are rollers; and wherein each of the plurality of main and mediate rollers has a length and the main roller length is longer than the mediate roller length.

25. The bearing assembly of claim 24 wherein the ratio of the main roller length to the mediate roller length is between from about 2 to 1 to about 3 to 1.

26. The bearing assembly of claim 24 wherein the cage body is removeably engaged with the outer race.

27. A cage for use in an antifriction bearing assembly, the assembly including an outer race having an inner surface, an inner race having an outer surface, the inner surface of the outer race and the outer surface of the inner race defining a bearing assembly raceway, a plurality of main rollers positioned within the bearing assembly raceway, the main rollers in contact with the inner surface of the outer race and the outer surface of the inner race, and a plurality of mediate rollers positioned within the bearing assembly raceway in alternating relationship with the main rollers such that each of the mediate rollers is in rolling contact with a pair of the plurality of main rollers, the cage positioned within the bearing assembly raceway and comprising:
a cage body, the body having a plurality of parallel annular rims joined by a plurality of rungs, the rungs separated so as to define a plurality of main roller openings in the cage body for receiving the plurality of main rollers, the rungs having a plurality of mediate roller retainers extending from the rungs, the retainers permitting counter-rotating of the mediate rollers with the main rollers in the main roller openings.

* * * * *